United States Patent
Urkude et al.

(10) Patent No.: US 9,058,118 B1
(45) Date of Patent: Jun. 16, 2015

(54) TECHNIQUES FOR SYNCHRONIZING AND/OR CONSOLIDATING STORAGE AREAS

(75) Inventors: Suhas Girish Urkude, Sunnyvale, CA (US); Sasidharan Krishnan, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 868 days.

(21) Appl. No.: 12/347,096

(22) Filed: Dec. 31, 2008

(51) Int. Cl.
*G06F 12/00* (2006.01)
*G06F 3/06* (2006.01)
*G06F 9/455* (2006.01)

(52) U.S. Cl.
CPC .............. *G06F 3/0647* (2013.01); *G06F 3/067* (2013.01); *G06F 3/065* (2013.01); *G06F 9/45533* (2013.01); *G06F 9/45558* (2013.01)

(58) Field of Classification Search
None
See application file for complete search history.

(56) References Cited

U.S. PATENT DOCUMENTS

| | | | |
|---|---|---|---|
| 7,143,307 B1 * | 11/2006 | Witte et al. | 714/6.23 |
| 2009/0037679 A1 * | 2/2009 | Kaushik et al. | 711/162 |
| 2009/0037680 A1 * | 2/2009 | Colbert et al. | 711/162 |

OTHER PUBLICATIONS

Unknown, "Product Datasheet—VMware Storage vMotion", Retrieved from the Internet at: http://www.vmware.com/files/pdf/storage_vmotion_datasheet.pdf, Copyright © 2008.

* cited by examiner

*Primary Examiner* — Matthew Bradley
*Assistant Examiner* — Daniel Tsui
(74) *Attorney, Agent, or Firm* — Wilmer Cutler Pickering Hale and Dorr LLP

(57) ABSTRACT

Techniques for synchronizing storage areas are disclosed. In one particular exemplary embodiment, the techniques may be realized as an apparatus for synchronizing storage areas comprising a module to identify one or more source storage areas associated with a virtual machine, a module to create one or more destination storage areas corresponding to the one or more source storage areas, a module to link the one or more source storage areas with the one or more destination storage areas, a module to synchronize the one or more source areas with the one or more destination areas, and when synchronization is complete, a module to associate the virtual machine with the one or more destination storage areas and disassociate the virtual machine with the one or more source storage areas.

18 Claims, 4 Drawing Sheets

TECHNIQUES FOR SYNCHRONIZING AND/OR CONSOLIDATING STORAGE AREAS

FIELD OF THE DISCLOSURE

The present disclosure relates generally to storage area management and, more particularly, to techniques for synchronizing storage areas.

BACKGROUND OF THE DISCLOSURE

Virtualization may allow one physical server or group of servers to accomplish many tasks that may be usually dedicated to many different servers. A separate instance, or "virtual machine," may be created for a task. For example, a separate virtual machine may be created to function as a web server, and a separate virtual machine may be created to function as an e-mail server. Each of the virtual machines, however, may operate on the same physical server or group of servers, and may have access to the same storage pool. Consolidation may allow for decreased ownership and maintenance cost and may increase efficiency in administration and management.

Virtual machines may be linked to storage space. For example, a virtual machine may require access to one or more hard disk drives or magnetic or optical storage options. Storage space may be stored within one or more storage pools, which may be physical servers having access to a network.

A physical server may be removed from operation for many reasons. For example, a physical server may be taken off-line for maintenance, or a physical server may be upgraded or replaced. Additional physical servers may be added to a server pool to increase the overall capacity and resources of the server pool. Also, physical servers may be removed from a server pool to decrease the overall capacity of the server pool. Additionally, storage pools may be created or removed from a server pool for similar reasons.

A virtual machine may be moved from one physical server to another physical server. Storage space for a virtual machine may also be moved from one storage pool to another storage pool. It may be beneficial to move a virtual machine from one physical server to another physical server and/or move a storage area from one storage pool to another storage pool in a way that maximizes the ability of the virtual machine to accept additional instructions or requests.

Moving a virtual machine from one physical server to another may require copying memory of the virtual machine from one physical server to another physical server. Moving a storage area from one storage pool to another storage pool may take the virtual machine off-line while the storage area is copied.

In an environment that requires or desires high availability, moving storage areas associated with virtual machines by halting the virtual machine, moving the storage area, and restarting the virtual machine may be undesirable. A better solution may allow the virtual machine to continue to operate, with minimum or no impact, while the storage area is moved. By minimizing downtime, high availability may continue to be achieved.

In view of the foregoing, it may be understood that there are significant problems and shortcomings associated with current storage area migration technologies.

SUMMARY OF THE DISCLOSURE

Techniques for synchronizing storage areas are disclosed. In one particular exemplary embodiment, the techniques may be realized as an apparatus for synchronizing storage areas comprising a module to identify one or more source storage areas associated with a virtual machine, a module to create one or more destination storage areas corresponding to the one or more source storage areas, a module to link the one or more source storage areas with the one or more destination storage areas, a module to synchronize the one or more source areas with the one or more destination areas, and when synchronization is complete, a module to associate the virtual machine with the one or more destination storage areas and disassociate the virtual machine with the one or more source storage areas.

In accordance with further aspects of this particular exemplary embodiment, a module to remove the link between the one or more source storage areas and the one or more destination storage areas after the virtual machine is associated with the one or more destination storage areas may be provided.

In accordance with additional aspects of this particular exemplary embodiment, the link between the one or more source storage areas and the one or more destination storage areas may be removed by deleting the one or more source storage areas after the virtual machine is associated with the one or more destination storage areas.

In accordance with additional aspects of this particular exemplary embodiment, the link between the one or more source storage areas and the one or more destination storage areas may be removed by saving the one or more source storage areas as a backup after the virtual machine is associated with the one or more destination storage areas.

In accordance with further aspects of this particular exemplary embodiment, a module to remove the link between the one or more source storage areas and the one or more destination storage areas after the virtual machine is associated with the one or more destination storage areas may be provided.

In accordance with additional aspects of this particular exemplary embodiment, the one or more source storage areas may be continually synchronized with the one or more destination storage areas after the virtual machine is associated with the one or more destination storage areas.

In accordance with further aspects of this particular exemplary embodiment, synchronization may occur in the background.

In accordance with further aspects of this particular exemplary embodiment, the one or more source storage areas and the one or more destination areas may be on different logical drives.

In accordance with additional aspects of this particular exemplary embodiment, the one or more source storage areas and the one or more destination storage areas may be logical drives attached to different processors.

In another particular exemplary embodiment, the techniques may be realized as a method for synchronizing storage areas comprising identifying one or more source storage areas associated with a virtual machine, creating one or more destination storage areas corresponding to the one or more source storage areas, linking the one or more source storage areas with the one or more destination storage areas, synchronizing the one or more source areas with the one or more destination areas, and when synchronization is complete, associating the virtual machine with the one or more destination storage areas and disassociating the virtual machine with the one or more source storage areas.

In accordance with other aspects of this particular exemplary embodiment, the link between the one or more source storage areas and the one or more destination storage areas after the virtual machine is associated with the one or more destination storage areas may be removed.

In accordance with further aspects of this particular exemplary embodiment, the link between the one or more source storage areas and the one or more destination storage areas may be removed by deleting the one or more source storage areas after the virtual machine is associated with the one or more destination storage areas.

In accordance with additional aspects of this particular exemplary embodiment, the link between the one or more source storage areas and the one or more destination storage areas may be removed by saving the one or more source storage areas as a backup after the virtual machine is associated with the one or more destination storage areas.

In accordance with other aspects of this particular exemplary embodiment, the one or more source storage areas may be continually synchronized with the one or more destination storage areas after the virtual machine is associated with the one or more destination storage areas.

In accordance with further aspects of this particular exemplary embodiment, synchronization may occur in the background.

In accordance with additional aspects of this particular exemplary embodiment, the one or more source storage areas and the one or more destination areas may be on different logical drives.

In accordance with other aspects of this particular exemplary embodiment, the one or more source storage areas and the one or more destination storage areas may be logical drives attached to different processors.

In accordance with further aspects of this particular exemplary embodiment, at least one processor readable medium for storing a computer program of instructions configured to be readable by at least one processor for instructing the at least one processor to execute a computer process for performing the method may be provided.

In another particular exemplary embodiment, the techniques may be realized as an article of manufacture comprising at least one processor readable medium, and instructions carried on the at least one medium, wherein the instructions may be configured to be readable from the at least one medium by at least one processor and thereby cause the at least one processor to operate so as to: identify one or more source storage areas associated with a virtual machine, create one or more destination storage areas corresponding to the one or more source storage areas, link the one or more source storage areas with the one or more destination storage areas, synchronize the one or more source areas with the one or more destination areas, and when synchronization is complete, associate the virtual machine with the one or more destination storage areas and disassociate the virtual machine with the one or more source storage areas.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
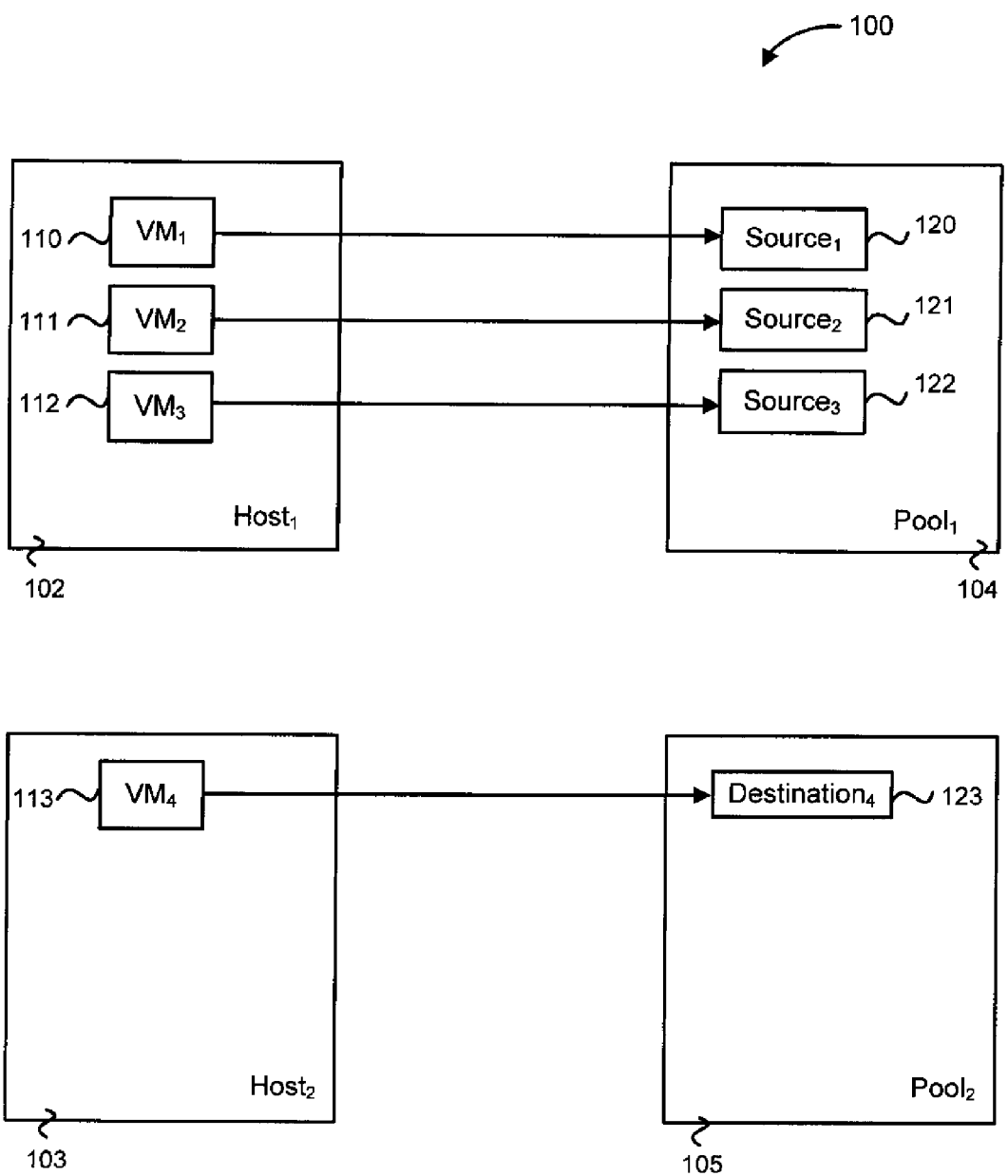
FIG. 1 shows a diagram of a virtual machine host and storage pool in accordance with an embodiment of the present disclosure.

Referring to FIG. 1, there is shown a diagram of virtual machine hosts and storage pools 100 in accordance with an embodiment of the present disclosure.

Host1 102 and Host2 103 may be physical devices commonly known in the art. For example, Host1 102 and Host2 103 may be implemented as servers. Host1 102 and Host2 103 may receive data from one or more inputs, produce data through one or more outputs, have one or more persistent storage devices for storing and retrieving data, and be in communication with one or more networks. Host1 102 and Host2 103 may operate using an operating system, and may load the operating system into memory in local persistent storage, for example, a hard drive, or may load the operating system into memory in shared storage across a network.

Within Host1 102 and Host2 103, one or more virtual machines 110, 111, 112, and 113 may be instantiated. For example, within Host1 102, VM1 110, VM2 111, and VM3 112 may be instantiated. Within Host2 103, VM4 113 may be instantiated. Host1 102 and Host2 103 may include any number of virtual machines. A virtual machine may appear to be a physical system, but instead may be instantiated on Host1 102 and Host2 103. A virtual machine may appear to receive data from one or more inputs, produce data through one or more outputs, have addressable memory and persistent storage for storing and retrieving data, and be in communication with one or more networks.

Virtual machines may migrate or be transferred between Host1 102 and Host2 103. For example, VM1 110, shown hosted on Host1 102, may move to Host2 103. Migration may help to distribute processor or memory or persistent storage requirements between systems. Virtual machines may also migrate between Host1 102 and Host2 103 to diversify operations. For example, if Host1 102 fails, at least one virtual machine hosted on Host2 103 may be available to continue processing tasks previously processed on Host1 102.

Pool1 104 and Pool2 105 may be storage pools of one or more storage devices. Pool1 104 and Pool2 105 may be physical devices commonly known in the art. For example, Pool1 104 and Pool2 105 may be implemented as servers and/or one or more appliances. Pool1 104 and Pool2 105 may receive data from one or more inputs, produce data through one or more outputs, have one or more persistent storage devices for storing and retrieving data, and be in communication with one or more networks. Pool1 104 and Pool2 105 may operate using an operating system, and may load the operating system into memory in local persistent storage, for example, a hard drive, or may load the operating system into memory in shared storage across a network. Pool1 104 and Pool2 105 may access one or more storage devices. The storage devices may be, for example and without limitation, magnetic disk drives, optical disk drives, random access memory ("RAM") devices, flash memory, or any other type of media to store and recall data. Pool1 104 and Pool2 105 may be subdivided into one or more storage areas. The storage areas may be addressable areas of available media to which one or more virtual machines is assigned. The virtual machines may store and recall data from their assigned storage area.

The virtual machines may be associated with one or more storage areas within the storage pools. For example, VM1 110 may be assigned to access storage area Source1 120 on Pool1 104, VM2 111 may be assigned to access storage area Source2 121 on Pool1 104, VM3 112 may be assigned to access storage area Source3 122 on Pool1 104, and VM4 113 may be assigned to access storage area Destination4 123 on Pool2 105.

Each of the one or more networks referenced above may include, but is not limited to, for example, a wide area network (WAN), a local area network (LAN), a fiber channel network, an optical network, a SCSI network, a global network such as the Internet, a telephone network such as a public switch telephone network, a wireless communication network, a cellular network, an intranet, or the like, or any combination thereof. Also, each of the one or more networks may be used so that components of the present disclosure may be in communication with one another. In exemplary embodiments of the present disclosure, a network may include one or any number of the exemplary types of networks mentioned above operating as a stand-alone network or in cooperation with each other. Use of the term network herein is not intended to limit the network to a single network.

Figure 2:
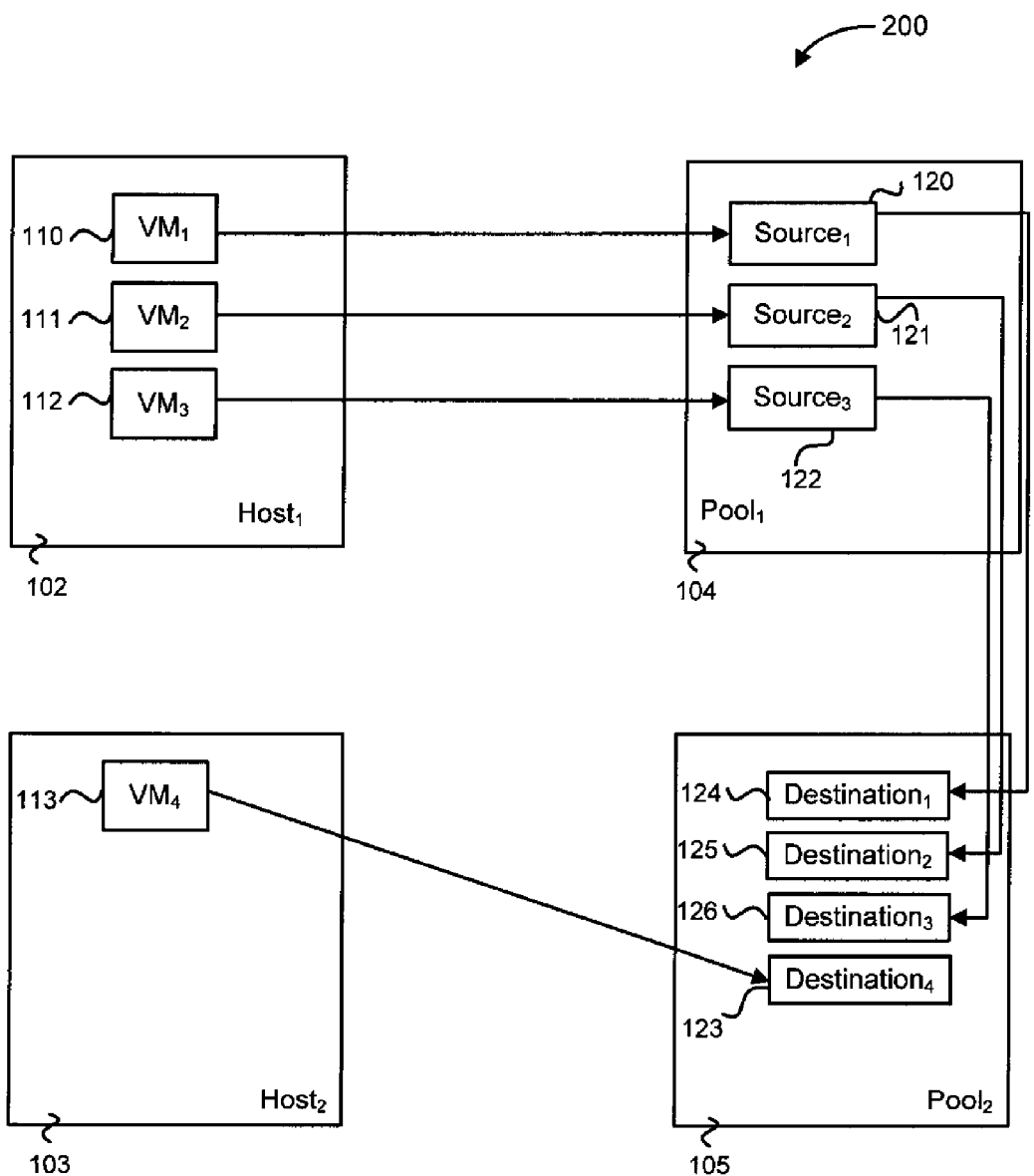
FIG. 2 shows a diagram of a virtual machine host and storage pools in the linking phase in accordance with an embodiment of the present disclosure.
Figure 3:
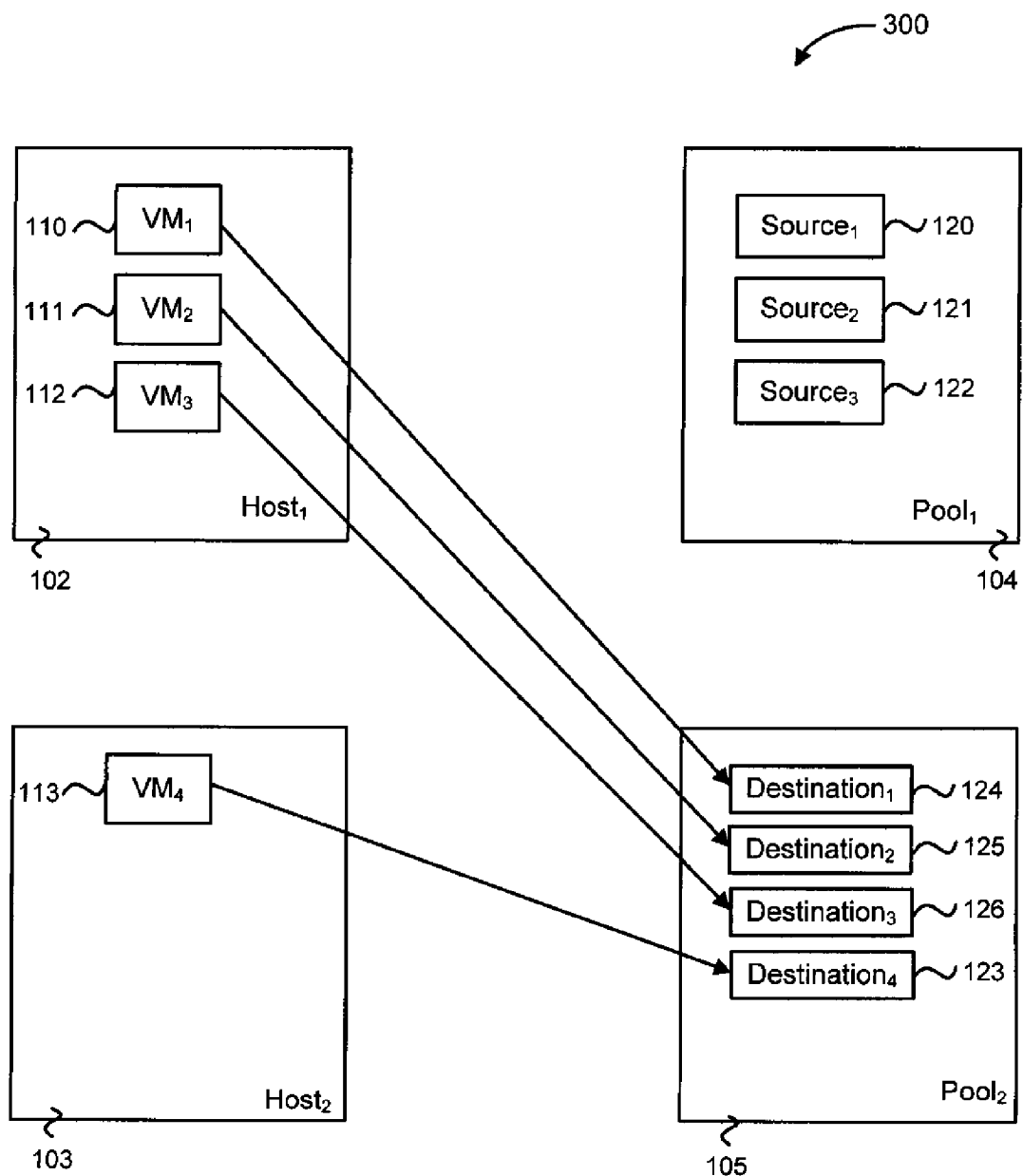
FIG. 3 shows a diagram of a virtual machine host and storage pools in the crossover phase in accordance with an embodiment of the present disclosure.

FIGS. 2 and 3 are intended to show embodiments of the present disclosure, where the storage areas associated with virtual machines VM1 110, VM2 111, and VM3 112 are moved from Pool1 104 to Pool2 105.

Turning specifically to FIG. 2, a diagram of virtual machine hosts and storage pools 200 in a linking phase in accordance with an embodiment of the present disclosure is shown. In FIG. 2, new storage areas Destination1 124, Destination2 125, and Destination3 126 have been created in Pool2 105. The new storage areas are intended to be replacements for Source1 120, Source2 121, and Source3 122 in Pool1 104. The source and destination storage areas may be similarly sized, so that data from a source storage area in Pool1 104 may be transferred to a destination storage area in Pool2 105. The source storage areas and the associated destination storage areas are linked, so that Source1 120 is linked to Destination1 124, Source1 121 is linked to Destination2 125, and Source3 122 is linked to Destination3 126. Linking a source storage area and a destination storage area may allow the source storage area and the destination storage area to share data.

Data may be copied from a source storage area to a destination storage area while the source storage area and the destination storage area are linked. This process of copying data may be known as synchronizing the storage areas. Using as an example the synchronization of Source1 120 with Destination1 124, some or all of the data contained within storage area Source1 120 may be copied to storage area Destination1 124. VM1 110, which is associated with Source1 120, may continue to operate while the synchronization occurs. The synchronization process may occur in the background or as a low priority process, so that the overall impact of the performance of VM1 110 is negligible or zero. Input and/or output requests processed by VM1 110 may require writes to or reads from Source1 120. If, during the synchronization process, a portion of Source1 120 that has been copied to Destination1 124 is written to or overwritten, then the change may be transmitted to Destination1 124.

Turning now to FIG. 3, a diagram of virtual machine hosts and storage pools 300 in a crossover phase in accordance with an embodiment of the present disclosure is shown. After synchronization of Source1 120 and Destination1 124 is complete, some or all of the data stored on Source1 120 has been copied to Destination1 124. When the data has been copied successfully, virtual machine VM1 110 may be associated with Destination1 124 in Pool2 105 instead of Source1 120 in Pool1 104. As the data is similar or identical between Source1 120 and Destination1 124, VM1 110 may continue to operate with minimal or no interruption. After VM1 110 is associated with Destination1 124, the link between Destination1 124 and Source1 120 may be severed. In alternate embodiments, the link between Destination1 124 and Source1 120 is severed before VM1 110 is associated with Destination1 124. In a further alternate embodiment, the link between Source1 120 and Destination1 124 is not severed, and Source1 120 may continue to operate as a full or partial mirror of Destination1 124.

If the link between Source1 120 and Destination1 124 is severed and VM1 110 is associated with Destination1 124, Source1 120 may be deleted from Pool1 104. In an alternate embodiment, Source1 120 may not be deleted, but may be retained as a historical mirror backup.

The process of creating destination storage areas on a different storage pool, linking the source and destination storage areas, synchronizing the source and destination storage areas, associating the associated virtual machine with the destination storage area, and deleting or archiving the source storage area may be repeated for, for example, the Source2 121/Destination2 125 storage areas and the Source3 122/Destination3 126 storage areas. If the source storage areas in Pool1 104 have been transferred to Pool2 105, then Pool1 104 may be taken off-line or may be reassigned as necessary.

A system to create destination storage areas, to link source storage areas with destination storage areas, to synchronize the source storage areas with the destination storage areas, and to associate virtual machines with destination storage areas may be separate from Host1 102, Host2 103, Pool1 104 and/or Pool2 105, and may reside in a separate physical server or servers in the form of one or more modules operating electronically on the separate physical server or servers. In an alternate embodiment, such a system may reside as a collection of one or more modules on either Host1 102, Host2 103, Pool1 104, and/or Pool2 105, or a collection of one or more of Host1 102, Host2 103, Pool1 104, and/or Pool2 105.

Figure 4:
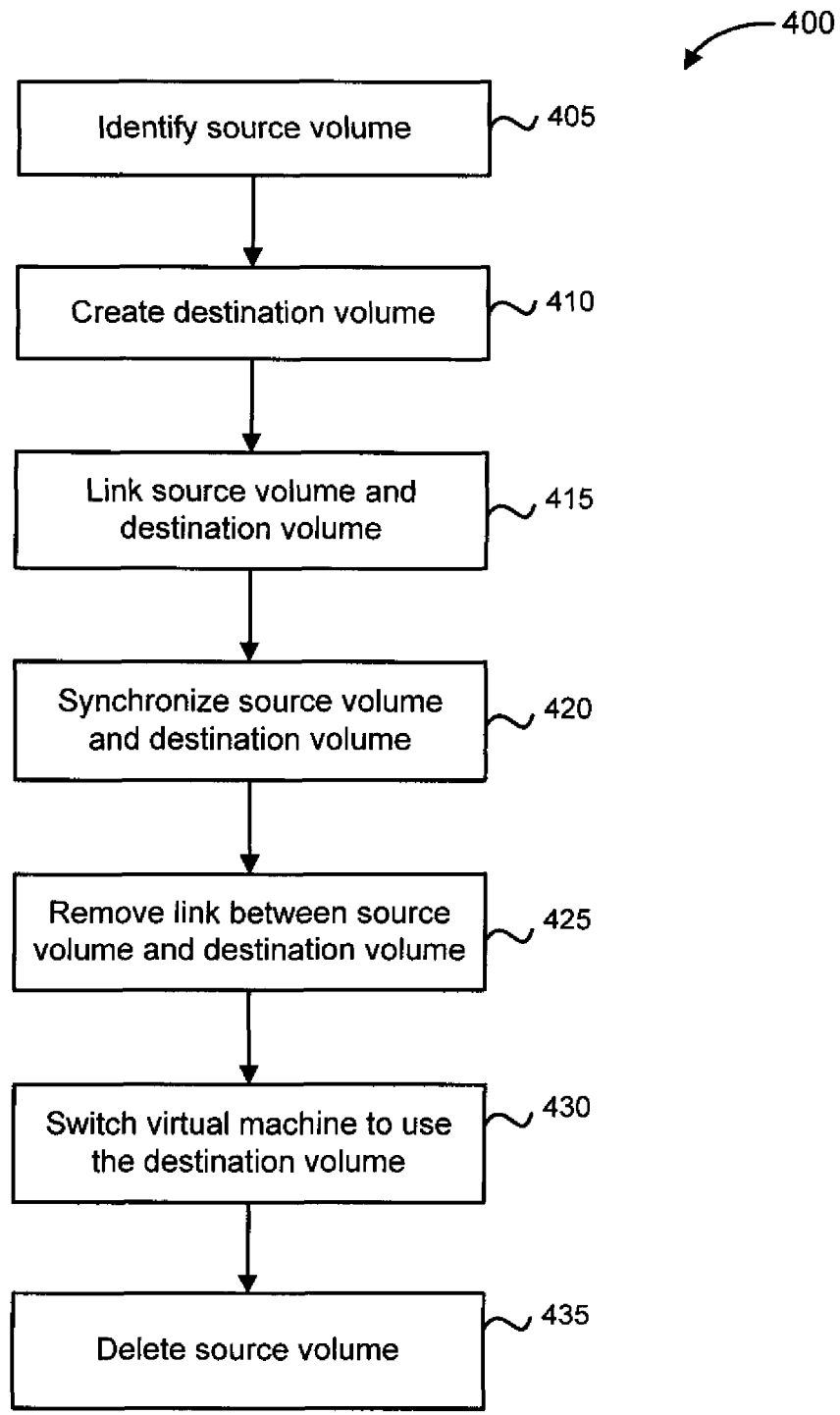
FIG. 4 shows an exemplary flow chart of a method in accordance with an embodiment of the present disclosure.

Turning now to FIG. 4, an exemplary flow chart of a method 400 in accordance with an embodiment of the present disclosure is shown. In step 405, a source volume is identified. The source volume may be one or more storage areas associated with a virtual machine. The source volume may reside in a storage pool, or may reside on one or more physical devices dedicated to the source volume.

In step 410, a destination volume may be created. The destination volume may be one or more storage areas in a storage pool, or may reside on one or more physical devices dedicated to the destination volume. The storage pool or the one or more physical devices for the destination volume may be different than the storage pool or the one or more physical devices for the source volume. The source volume and the destination volume may be substantially similar in size, or the destination volume may be larger than the source volume, or the destination volume may be smaller than the source volume.

In step 415, the source volume and the destination volume may be linked. The virtual machine may continue to utilize the source volume, and may not be able to directly address the destination volume at this step.

In step 420, the source volume and the destination volume are synchronized. During the synchronization process, the virtual machine may continue to operate, and may address the source volume. In one embodiment, the virtual machine may not be able to directly address the destination volume while the synchronization process is occurring. In an alternate embodiment, the virtual machine may be able to address both the source volume and the destination volume, and may address one or both during operation. Synchronization may occur as a background process, so that the ability of the virtual machine to process input and output requests may not be substantially altered during the synchronization process.

In step 425, after synchronization is complete, the link between the source volume and the destination volume may be removed or severed.

In step 430, the virtual machine is directed to address the destination volume.

In an alternate embodiment, step 425 and step 430 may be reversed, so that the virtual machine is directed to address the destination volume before the link between the source volume and the destination volume is severed. When the link between the source volume and the destination volume is severed, and the virtual machine is directed to address the destination volume, the virtual machine may not be able to address the source volume. The source volume may not be updated further.

In step 435, the source volume is deleted to create space on the storage pool housing the source volume. In an alternate embodiment, once the link between the source volume and the destination volume is severed, the source volume may be retained for use as a mirrored backup.

At this point it should be noted that storage area synchronization in accordance with the present disclosure as described above typically involves the processing of input data and the generation of output data to some extent. This input data processing and output data generation may be implemented in hardware or software. For example, specific electronic components may be employed in a server or electronic processor or similar or related circuitry for implementing the functions associated with storage area synchronization in accordance with the present disclosure as described above. Alternatively, one or more processors operating in accordance with instructions may implement the functions associated with storage area synchronization in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. An apparatus for synchronizing storage areas comprising:
   at least one processor configured to:
      identify one or more source storage areas associated with a virtual machine;
      create one or more destination storage areas corresponding to the one or more source storage areas;
      link the one or more source storage areas directly with the one or more destination storage areas;
      synchronize the one or more source areas with the one or more destination storage areas in order to establish data consistency among the one or more source areas with the one or more destination areas, wherein operation of the virtual machine continues during synchronization, wherein synchronization operates as a low priority process with negligible impact to virtual machine performance, wherein portions of the one or more source areas are changed during synchronization and the changed portions are transmitted to the one or more destination storage areas prior to completion of synchronization; and
      associate, when synchronization is complete, the virtual machine with the one or more destination storage areas and disassociate the virtual machine with the one or more source storage areas.

2. The apparatus of claim 1, further comprising removing the link between the one or more source storage areas and the one or more destination storage areas after the virtual machine is associated with the one or more destination storage areas.

3. The apparatus of claim 2, where the link between the one or more source storage areas and the one or more destination storage areas is removed by deleting the one or more source storage areas after the virtual machine is associated with the one or more destination storage areas.

4. The apparatus of claim 2, where the link between the one or more source storage areas and the one or more destination storage areas is removed by saving the one or more source storage areas as a backup after the virtual machine is associated with the one or more destination storage areas.

5. The apparatus of claim 1, wherein synchronization occurs in background.

6. The apparatus of claim 1, wherein the one or more source storage areas and the one or more destination storage areas are on different logical drives.

7. The apparatus of claim 1, wherein the one or more source storage areas and the one or more destination storage areas are logical drives attached to different processors.

8. The apparatus of claim 1, wherein the one or more source storage areas are continually synchronized with the one or more destination storage areas after the virtual machine is associated with the one or more destination storage areas.

9. A method for synchronizing storage areas comprising:
   identifying, by at least one processor, one or more source storage areas associated with a virtual machine;
   creating one or more destination storage areas corresponding to the one or more source storage areas;
   linking the one or more source storage areas directly with the one or more destination storage areas;
   synchronizing the one or more source areas with the one or more destination storage areas in order to establish data consistency among the one or more source areas with the one or more destination areas, wherein operation of the virtual machine continues during synchronization, wherein synchronization operates as a low priority process with negligible impact to virtual machine performance, wherein portions of the one or more source areas are changed during synchronization and the changed portions are transmitted to the one or more destination storage areas prior to completion of synchronization; and associating, when synchronization is complete, the virtual machine with the one or more destination storage areas and disassociating the virtual machine with the one or more source storage areas, wherein the one or more source storage areas are continually synchronized with the one or more destination storage areas after the virtual machine is associated with the one or more destination storage areas.

10. The method of claim 9, further comprising removing the link between the one or more source storage areas and the one or more destination storage areas after the virtual machine is associated with the one or more destination storage areas.

11. The method of claim 10, where the link between the one or more source storage areas and the one or more destination storage areas is removed by deleting the one or more source storage areas after the virtual machine is associated with the one or more destination storage areas.

12. The method of claim 10, where the link between the one or more source storage areas and the one or more destination storage areas is removed by saving the one or more source storage areas as a backup after the virtual machine is associated with the one or more destination storage areas.

13. The method of claim 9, wherein synchronization occurs in background.

14. The method of claim 9, wherein the one or more source storage areas and the one or more destination storage areas are on different logical drives.

15. The method of claim 9, wherein the one or more source storage areas and the one or more destination storage areas are logical drives attached to different processors.

16. At least one non-transitory processor readable medium for storing a computer program of instructions configured to be readable by at least one processor for instructing the at least one processor to execute a computer process for performing the method as recited in claim 9.

17. The method of claim 9, wherein the one or more source storage areas are continually synchronized with the one or more destination storage areas after the virtual machine is associated with the one or more destination storage areas.

18. An article of manufacture for synchronizing storage areas, the article of manufacture comprising:
at least one non-transitory processor readable medium; and
instructions carried on the at least one medium;
wherein the instructions are configured to be readable from the at least one medium by at least one processor and thereby cause the at least one processor to operate so as to:
identify one or more source storage areas associated with a virtual machine;
create one or more destination storage areas corresponding to the one or more source storage areas;
link the one or more source storage areas directly with the one or more destination storage areas;
synchronize the one or more source areas with the one or more destination storage areas in order to establish data consistency among the one or more source areas with the one or more destination areas, wherein operation of the virtual machine continues during synchronization, wherein synchronization operates as a low priority process with negligible impact to virtual machine performance, wherein portions of the one or more source areas are changed during synchronization and the changed portions are transmitted to the one or more destination storage areas prior to completion of synchronization; and
associate, when synchronization is complete, the virtual machine with the one or more destination storage areas and disassociate the virtual machine with the one or more source storage areas, wherein the one or more source storage areas are continually synchronized with the one or more destination storage areas after the virtual machine is associated with the one or more destination storage areas.

\* \* \* \* \*